United States Patent [19]

Kramer et al.

[11] Patent Number: 5,322,359
[45] Date of Patent: Jun. 21, 1994

[54] PROCESS AND APPARATUS FOR MEASURING LASER POWER

[75] Inventors: Reinhard Kramer, Pfungstadt; Kurt Wissenbach; Paul Briesch, both of Aachen, all of Fed. Rep. of Germany

[73] Assignee: Thyssen Stahl AG, Duisburg, Fed. Rep. of Germany

[21] Appl. No.: 861,866

[22] PCT Filed: Dec. 18, 1990

[86] PCT No.: PCT/EP90/02224
§ 371 Date: Nov. 2, 1992
§ 102(e) Date: Nov. 2, 1992

[87] PCT Pub. No.: WO91/10117
PCT Pub. Date: Jul. 11, 1991

[30] Foreign Application Priority Data

Dec. 21, 1989 [DE] Fed. Rep. of Germany ....... 3942293

[51] Int. Cl.$^5$ ............................................. G01K 17/20
[52] U.S. Cl. ...................... 374/32; 374/183
[58] Field of Search .............. 374/32, 45, 141, 163, 374/183, 129, 133; 250/338.1

[56] References Cited

U.S. PATENT DOCUMENTS

| | | | |
|---|---|---|---|
| 2,442,823 | 6/1948 | Poyle | 374/32 |
| 2,993,138 | 7/1961 | Scott, Jr. | 374/32 |
| 3,282,100 | 11/1966 | Baker . | |
| 3,387,134 | 6/1968 | Treharne | 374/133 |
| 3,394,258 | 7/1968 | Schleiger et al. | 374/32 |
| 3,622,245 | 11/1971 | Rasmussen | 374/32 |
| 4,522,511 | 6/1985 | Zimmerer | 374/32 |

FOREIGN PATENT DOCUMENTS

| | | |
|---|---|---|
| 0050159 | 4/1982 | European Pat. Off. . |
| 1698093 | 7/1971 | Fed. Rep. of Germany . |
| 2851879 | 7/1979 | Fed. Rep. of Germany . |
| 62-121384 | 6/1987 | Japan ...................... 374/32 |

OTHER PUBLICATIONS

"Feindraht-Kalorimeter Zur Absoluten Messung Der Energie Von Lasern", Von G. Fenske, Berlin, Experimentelle Technik der Physik, XV, 1967, Heft 2, pp. 132–137.

*Primary Examiner*—William A. Cuchlinski, Jr.
*Assistant Examiner*—G. Bradley Bennett
*Attorney, Agent, or Firm*—Sprung, Horn, Kramer & Woods

[57] ABSTRACT

A device for measuring the power of a laser beam includes an electrically actuable measuring wire (10) having a temperature-dependent electrical resistance which is subjected to a relative reciprocatory movement transversely over the beam cross-section. A compensation wire having a temperature-dependent electrical resistance is disposed parallel to and closely adjoining the measuring wire (10), with each of the two wires (10, 11) having a different degree of absorption of laser radiation. A current source (12) connected to each of the two wires (10, 11), supplies a steady current thereto. A measuring device (13) is connected to each of the two wires (10, 11) and a dividing circuit (31) with a connected display device (33) is coupled to each measuring device (13) for processing the measured values of the measuring devices (13).

12 Claims, 2 Drawing Sheets

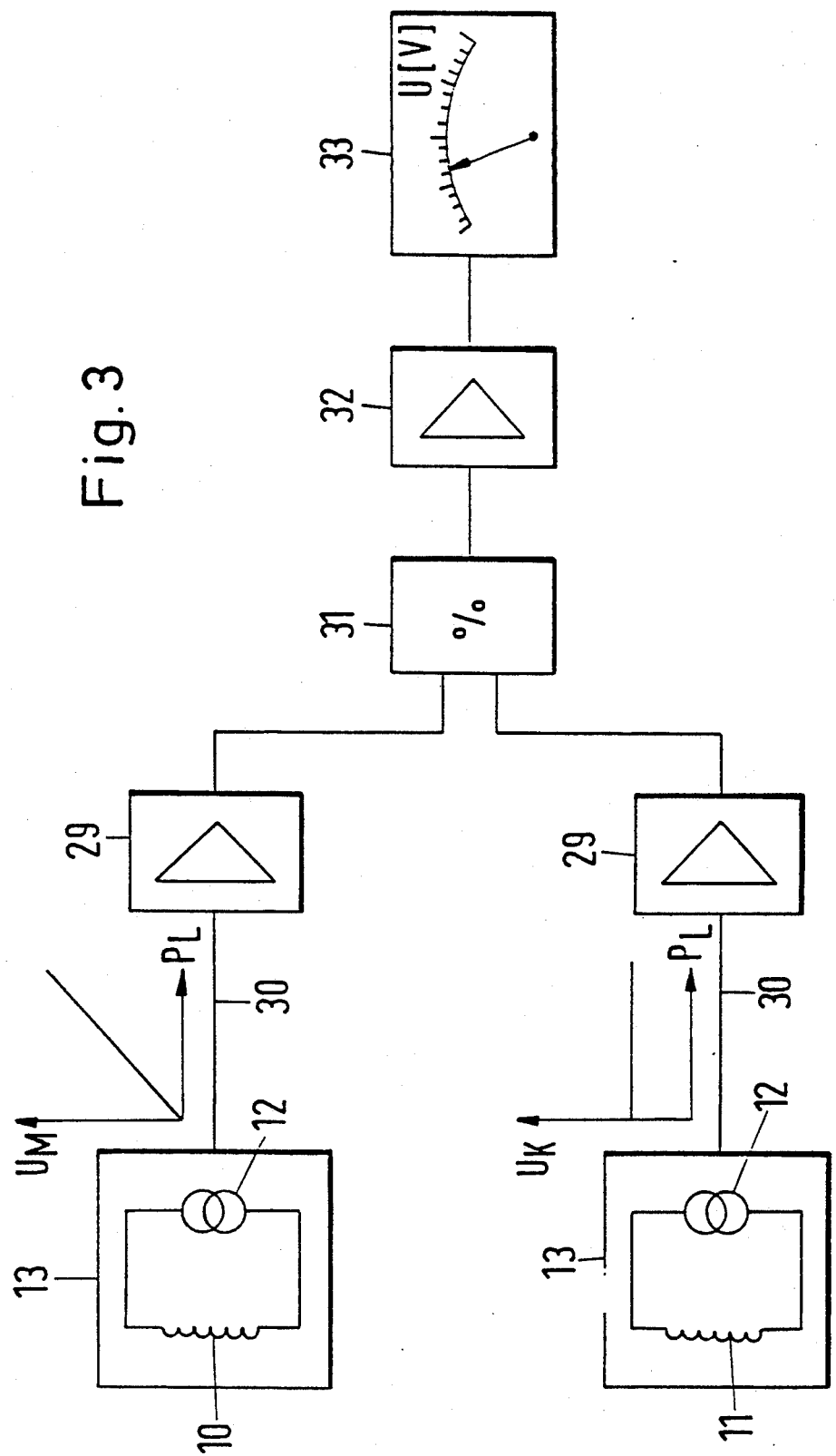

PROCESS AND APPARATUS FOR MEASURING LASER POWER

BACKGROUND OF THE INVENTION

The invention relates to a process for measuring laser power, wherein an electrically actuable measuring wire or the like having a temperature-resistant electrical resistance is subjected to a relative reciprocatory movement transversely over the beam cross-section.

To measure laser power, it is generally known to provide a detector to absorb the whole beam. During the measuring period it is impossible to process a workpiece using the laser beam. It is also generally known to measure a portion of the laser beam using a reflecting element or a partially transmissive optical system, so that the measurement can in principle be performed even during the processing of the workpiece. However, the reflecting element or the partially transmissive optical system may have an adverse effect on the laser beam or itself be destroyed or damaged by excessive radiation powers or intensities. For this reason as a rule it is impossible; to perform measurement between the focusing optical system of the laser beam and the workpiece.

EP B1 0050159 discloses a process having the steps mentioned hereinbefore. That process uses the temperature dependence of the electrical resistance of the measuring wire to obtain a measured value for the power of the laser beam. However, the measured value is adversely affected by interferences, for example, different heat transfer resistances depending on convection.

SUMMARY OF THE INVENTION

It is therefore an object of the invention so to improve the process of the type specified above so that the laser power can be measured free from interferences in an on-line measurement.

This object, as well as other objects that will become apparent from the discussion that follows, are achieved, in accordance with the present invention, by moving the measuring wire in relation to the beam cross-section in a time substantially shorter than its thermal time constant. A parallel compensation wire is also provided, closely adjacent to the measuring wire, and which is also electrically actuable and has a temperature-dependent electrical resistance and which has a degree of absorption of the laser radiation which is low in comparison with the measuring wire. The measured values of the two wires are determined and their quotient is calculated as a measure of the laser power independent of the convectional cooling of the two wires.

This process starts from the fact that the radiation power absorbed by the measuring wire is given off in the form of heat to the surroundings of the measuring wire, a state of equilibrium being set up as a result. The heat is given off by radiation and convection, the proportion of radiation being negligible due to the relatively low temperature of the measuring wire. The heat given off by convection depends on the heat transfer resistance $\alpha$ of the measuring wire. The heat transfer resistance $\alpha$ depends to a small extent on temperature and is inversely proportional to the wire diameter or depends on the cross-sectional geometry of the measuring element used. Moreover, the cooling of the measuring wire by convection must not be regarded as constant, since currents of the convectional cooling flow are set up at the measuring place—i.e., flows of air or process gas, such as are used to influence processing at the place where a workpiece is processed. These flows result in a heavier cooling of the measuring wire, so that the measured value achieved thereby is too low. The radiation power is displayed with too low a value. By means of the compensation wire the influence of convectional cooling on the measuring result—i.e., the influence of the heat transfer resistance $\alpha$ on the cooling and measuring wire—can be eliminated. Since the two wires are close to one another, the influence of the air flow on the cooling of the two wires is identical in each case. If the measured values of the two wires are brought into ratio with one another, the influence of the air flow and also the dependence of the heat transfer resistance $\alpha$ on the convectional cooling are eliminated. One important feature is that the compensation wire has a low degree of absorption of laser radiation in comparison with the measuring wire, so that any change in the measured value of the compensation wire is to be mainly ascribed to convectional cooling. On the other hand, any change in the laser power affects only the measured value of the measuring wire.

Conveniently the two wires are electrically actuated by the feature that the measuring current is kept constant in the two wires, and the voltage drops across the wires are used as the measured values for forming the quotient. The constant current causes voltage drops corresponding to the resistance of the particular wire. Consequently, the drop in voltage of the measuring wire is proportional to that change in resistance which is caused by the change in the temperature of the wire due to the absorption of laser radiation.

To ensure that the measuring current over the measuring wire influences the measuring result as little as possible, the process is so performed that the measuring current introduces into the measuring wire a power which is low in comparison with the laser beam power absorbed thereby.

To allow for the fact that the compensation wire absorbs a certain percentage of the laser power, the process is so performed that the compensation current introduces into the compensation wire a power which is high in comparison with the laser beam power absorbed thereby. In that case the measured value determined by means of the compensation wire is independent of the laser power absorbed thereby.

To eliminate the influence of the ambient temperature on the measuring result, according to the invention, prior to the formation of the quotient, a base voltage drop due to the ambient temperature is deducted from each of the voltage drops at the wires.

The invention also relates to an apparatus for measuring laser power having an electrically actuated measuring wire or the like which has a temperature-dependent electrical resistance and is subjected to relative reciprocal movement transversely over the beam cross-section. To ensure that the measuring result is free from the aforedescribed disadvantages, the apparatus is so constructed that a parallel compensation wire having a temperature-dependent electrical resistance is disposed closely adjoining the measuring wire. Each of the two wires has a different degree of absorption of laser radiation and each of the two wires is connected to a current source and a measuring device. A dividing circuit with connected display device is provided which processes the measured values of the measuring devices. The measured result freed from the influences of the heat transfer resistance and the speed of flow can be read off from the display device and/or further utilized for purposes of process control. Preferably the current source is a constant current source, and the measuring devices are voltmeters.

The apparatus is disposed fixed in the pivoting range of a reciprocated laser beam, so that therefore relative mobility between the laser beam and the wires is achieved by the movement of the ray. The use of an apparatus having fixed wires is particularly advantageous if in any case a reciprocated or scanned laser beam must be used in the processing of the workpiece.

To increase the measuring signal, the wires are disposed at an inclination to the relative pivoting path of the laser beam.

The measuring wire has the highest possible coefficient of absorption and the compensation wire absorbs as little laser power as possible, due to a low degree of absorption in comparison with the measuring wire, if the measuring wire used is a blackened wire and the compensation wire is a bright nickel wire having the same dimensions.

Advantageously a constrained gas flow is provided in the range of relative movement of the wires. As a result, the device and its measuring range can be adapted to the given circumstances.

The two measuring devices will not be influenced, by fluctuations in the ambient temperature and will have no effect on the display and measured value of laser power, if an electrically actuated reference wire having a temperature-dependent resistance is provided outside the relative pivoting zone of the laser beam and is connected to the measuring devices in a manner equalizing the fluctuations of the ambient temperature.

Embodiments of the invention will now be explained with reference to the drawings.

BRIEF DESCRIPTION OF THE DRAWING

FIG. 3 is a block circuit diagram of the measuring device according to the invention.

DESCRIPTION OF THE PREFERRED EMBODIMENTS

Figure 1:
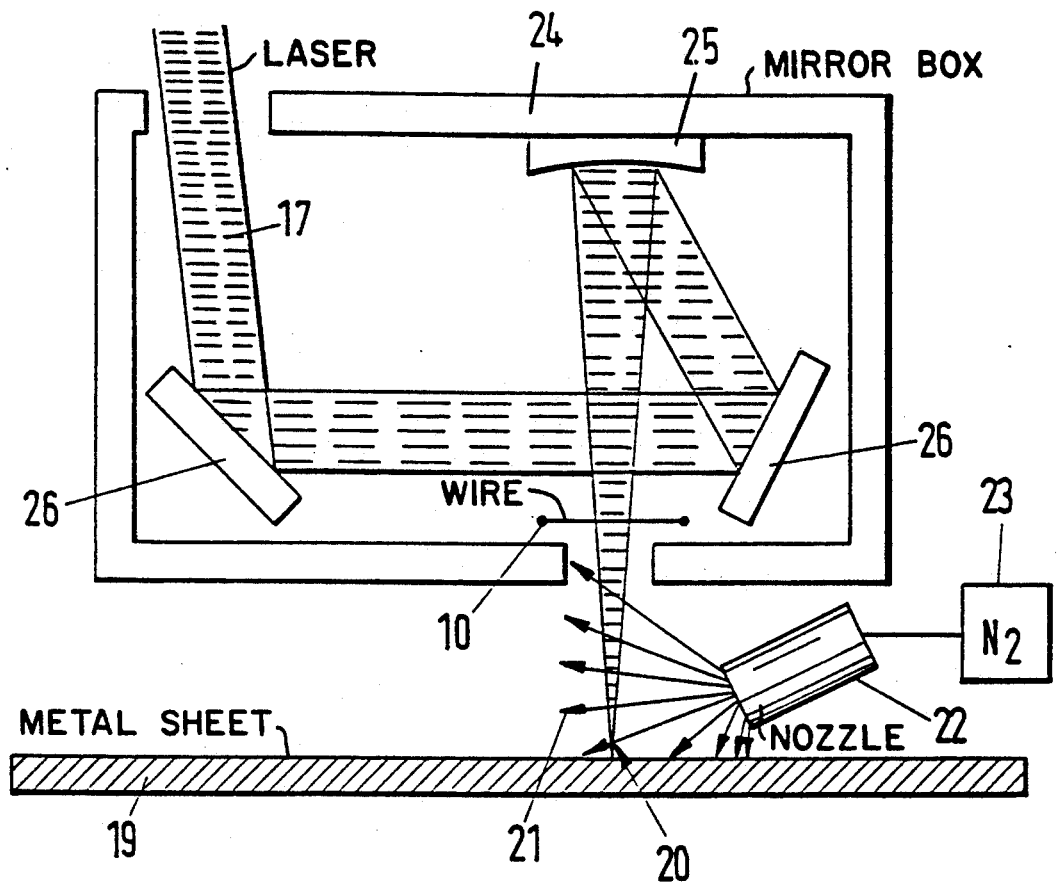
FIG. 1 is a diagrammatic side elevation of a measuring device which is combined with a device for focusing the laser beam.

FIG. 1 shows diagrammatically a metal sheet 19 which is to be processed by a laser beam 17 of a laser (not shown) and which is to be welded, for example, to another metal sheet. The welding operation is performed with a high laser power, for example, higher than 1000 W, to achieve high welding speeds. A process gas 21 is blown on to processing place 20 from a nozzle 22 to which the process gas, for example, nitrogen ($N_2$), is supplied from a storage tank 23.

The laser beam 17 is used by means of a focusing optical system, shown diagrammatically in the form of a focusing mirror 25, to which the laser beam 17 is supplied via deflecting mirrors 26 and which is accommodated in a mirror box 24 and focuses on the processing place 20. Disposed inside the mirror box 24 transversely of the focused laser beam 17 is a measuring wire 10. The wire 10 can be arranged in any required manner in relation to the laser beam, in dependence on the circumstances of the construction. Advantageously the wire 10 measures on the already focused laser beam 17. Consequently, any power losses existing prior to measurement, for example, the reflection losses of all the optical elements 25, 26, have no effect on the measuring result.

Figure 2:
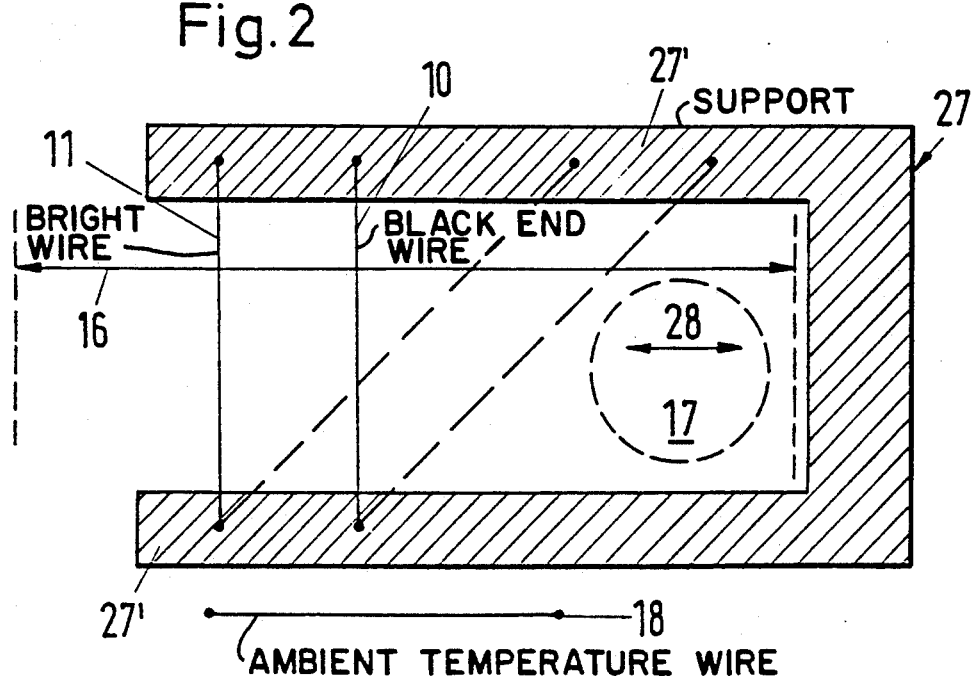
FIG. 2 is a plan view of the arrangement of measuring wires.

If the laser beam 17 is reciprocable perpendicularly to the plane of the drawing, something which might be achieved, for example, by a polygon mirror, in which case the mirrors 25, 26 shown in FIG. 1 would have to be mirror strips extending perpendicularly wire 10 stretched transversely thereof. In that case the position of the wire 10 can be fixed. If the laser beam 17 is itself fixed, the wire 10 must be reciprocated in relation thereto. FIG. 2 shows the relative pivoting range 16 of the laser beam 17, the wire 10 being borne by a U-shaped support 27 which enables the laser beam 17 to be reciprocated between the arms 27' in the directions indicated by double arrow 28. The two arms 27' retain the wire 10 stretched transversely in relation to the laser beam 17 and its path of movement. FIG. 2 also shows how the wires 10, 11 can be disposed, as indicated in chain lines, at an inclination to the relative pivoting path of the laser beam 17, so that its holding time on the wires 10, 11 is longer, the result being a larger measuring signal.

The wire 10 is blackened and therefore has a high degree of absorption $\epsilon$ for the laser radiation. Adjoining the wire 10 is a bright wire 11, which accordingly has a low degree of absorption $\epsilon$ for the laser radiation. The two wires—i.e., the blackened wire 10 as the measuring wire and the bright wire 11 as the compensation wire—can be electrically actuated (FIG. 3), each from a current source 12 constructed as a constant current source. The constant current source takes the form, for example, of an operational amplifier with a connected power field effect transistor. A constant voltage or power source can also be substituted for the constant current source, but this increases the expense of measuring and control.

The circuit shown in FIG. 3 incorporates a measuring device 13 (not shown in detail) which takes the form of a voltmeter and which measures the voltage drops $U_M$, $U_K$ across the wires 10, 11. Each of the measuring devices 13 transmits its measured values to amplifiers 29, the dependence of the measured values and the drop in voltages $U_M=f(P_L)$ and $U_K=f(P_L)$ respectively being shown above connecting cable 30. As can be seen, with increasing laser power the black measuring wire 10 delivers higher measured values, while in the ideal case the bright compensation wire 11 delivers a measured value independent of the laser power. The voltages resulting due to the differential flow cooling of the wires 10, 11 are not plotted in FIG. 3, since in both cases they are identical and consequently cancel one another out when the quotient Q is formed with a dividing circuit 31. Connected to the dividing circuit 31 is a amplifier 32 delivering a value for a display device 33 which is, for example, a moving coil element.

The wires 10, 11 are, for example, pure nickel wires having a constant diameter of, e.g., 0.05 mm. One such wire is, for example, 6 cm in length, so that in comparison with the cross-sectional area of the laser beam 17 the wire has only a small absorption surface—i.e., shadows the laser beam only to a small extent. The measuring wire 10 is blackened, for example, with sulphuric acid and potassium sulphite and at a wavelength of 10.6 $\mu$m absorbs approximately 100% of the impinging laser radiation—i.e., has a degree of absorption of 1. In contrast, the compensation wire is bright and has a degree of absorption of 0.1.

The measuring current delivered by the current source 12 to the measuring wire 10 is, for example, 10 mA, so that with a resistance of 3.4 Ω an electric power of only 0.34 mW is introduced. That is not much, compared with the absorbed radiation power of approximately 300 mW which the measuring wire 10 absorbs with a beam power of 1500 W. The effect of the measuring current on the measuring result is therefore negligible. On the other hand, the electric power of the measuring current of the current source 12 for the compensation wire 11 must be comparatively high due to the radiation power absorbed thereby, this being the case, e.g., with 300 mA.

FIG. 2 also shows a reference wire 18 which can also be electrically actuated in a manner not shown and which has a temperature-dependent resistance. The reference wire 18, disposed outside the pivoting range 16 of the laser beam 17, is connected to the measuring devices 13 and delivers measured values corresponding to the ambient temperature. These values are subtracted from the measured values $U_K$; $U_M$, so that the quotient Q of the voltages $U_M$ and $U_K$ is not falsified by the effect of the ambient temperature.

In the performance of the process the laser beam 17 is reciprocated relatively rapidly over the wires 10, 11. If, for example, the laser beam passes 100 times over the wires 10, 11, the temperature fluctuation is comparatively small, more particularly in the measuring wire 10 also, since the wires 10, 11 have a high thermal time constant of, for example, 250 ms. During this time the radiation power absorbed by the wires 10, 11 is so given off to the surroundings by convectional cooling that a constant temperature is set up, and therefore correspondingly constant measured values are obtained. The value displayed by the display device 33 is therefore a mean value of the radiation power, measured over the whole beam cross-section.

The process according to the invention has various advantages. More particularly, the laser power can be measured at practically any place in the ray guidance system—i.e., including immediately above the workpiece. The only precondition is that the ray diameter must be larger in comparison with the wire diameter, so that shadowing and therefore the laser power absorbed by the measuring wire is not excessive.

Measurement can be performed in a problem-free manner during processing and has no reactions on the measuring result. More particularly, the measuring wire is insensitive to dirt and very inexpensive. It can readily be adapted to the different ray geometries and its measuring range can be adapted to the ray intensity and laser power by determining the degree of absorption of its surface, the wire diameter and also by a constrained gas flow. Not only a wire can be used as a sensor for measuring, but any other construction is also suitable which absorbs only a small proportion of the laser power. In such a case the measuring element and the compensation element must have the same design.

There has thus been shown and described a novel process and apparatus for measuring laser power which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. In a process for measuring laser power, wherein an electrically actuable measuring wire (10) having a temperature-dependent electrical resistance is subjected to a relative reciprocatory movement transversely over the laser beam cross-section, the improvement comprising the steps of:

moving the measuring wire (10) in relation to the beam cross-section in a time period substantially shorter than thermal time constant ($\tau$) of the wire; moving a compensation wire (11) in parallel with the closely adjacent to the measuring wire (10), said compensation wire being also electrically actuable and having a temperature-dependent electrical resistance and a degree of absorption of the laser radiation which is low in comparison with the measuring wire (10); determining measured values of resistance of the two wires (10, 11) and calculating their quotient (Q) as a measure of the laser power independent of the convectional cooling of the two wires (10, 11).

2. A process according to claim 1, wherein a constant measuring current is passed through each of the two wires (10, 11), and the voltage drops ($U_M$; $U_K$) across the respective wires (10, 11) are measured and used as the respective measured values for forming the quotient.

3. A process according to claim 2, wherein the measuring current introduces into the measuring wire (10) a power which is low in comparison with the laser beam power absorbed thereby.

4. A process according to claim 3, wherein the measuring current introduces into the compensation wire (11) a power which is high in comparison with the laser beam power absorbed thereby.

5. A process according to claim 2, wherein, prior to formation of the quotient, a base voltage drop ($U_U$) due to the ambient temperature is deducted from each of the voltage drops ($U_M$; $U_K$) across the wires (10, 11).

6. Apparatus for measuring laser power, comprising, in combination:

(a) an electrically actuable measuring wire (10) which has a temperature-dependent electrical resistance and which is subjected to a relative reciprocatory movement transversely over the beam cross-section; (b) a compensation wire (11) having a temperature-dependent electrical resistance disposed parallel to and closely adjoining the measuring wire (10), each of the two wires (10, 11) having a different degree of absorption of laser radiation; (c) a current source (12) connected to each of the two wires (10, 11); (d) a measuring device (13) connected to each of the two wires (10, 11); and (e) a dividing circuit (31) a connected display device (33) coupled to the measuring devices (13) for processing the measured values of the measuring devices (13).

7. The apparatus according to claim 6, wherein the current sources (12) are constant current sources, and the measuring devices are voltmeters.

8. The apparatus according to claim 6, wherein the apparatus is disposed fixed in the pivoting range (16) of a reciprocated laser beam (17).

9. The apparatus according to claim 8, wherein the wires (10, 11) are disposed at an inclination to the relative pivoting path of the laser beam (17).

10. The apparatus according to claim 6, wherein the measuring wire (10) is a blackend wire, and the compensation wire (11) is a bright nickel wire having substantially the same dimensions.

11. The apparatus according to claim 6, wherein a constrained gas flow is provided in the range of relative movement of the wires.

12. The apparatus according to claim 6, wherein an electrically actuated reference wire (18) having a temperature-dependent resistance is provided outside the relative pivoting zone (16) of the laser beam (17) and is connected to the measuring devices (13) in a manner equalizing the fluctuations of the ambient temperature.

* * * * *

UNITED STATES PATENT AND TRADEMARK OFFICE
CERTIFICATE OF CORRECTION

PATENT NO : 5,322,359
DATED : June 21, 1994
INVENTOR(S): Reinhard Kramer, et al.

It is certified that error appears in the above-identified patent and that said Letters Patent are hereby corrected as shown below:

Column 6, line 15, cancel "the" (in the first occurence) and substitute --and--.

Signed and Sealed this

Twenty-fourth Day of August, 1999

*Attest:*

Q. TODD DICKINSON

*Attesting Officer*     *Acting Commissioner of Patents and Trademarks*